Sept. 4, 1956 V. W. PETERSON 2,761,388
HYDRAULIC FLUID SYSTEM
Filed Aug. 10, 1951

Inventor
Victor W. Peterson
By
Willits, Helmig & Baillio
Attorneys

United States Patent Office 2,761,388
Patented Sept. 4, 1956

2,761,388

HYDRAULIC FLUID SYSTEM

Victor W. Peterson, Indianapolis, Ind., assignor to General Motors Corporation, Detroit, Mich., a corporation of Delaware Application August 10, 1951, Serial No. 241,347

15 Claims. (Cl. 103—11)

My invention relates to hydraulic fluid systems and, particularly, to a system which is adapted to serve efficiently under conditions in which either a relatively large or relatively small flow of fluid is required. By way of illustration of the principles of the invention, it will be described in terms of its preferred embodiment in a fluid system which services a reduction gear in which a continuous relatively small flow of lubricating oil to the gears and bearings of the reduction gears is required, and in which a large volume flow of oil is required from time to time to lubricate and cool clutches in the reduction gear when these clutches are engaged.

A reduction gear of the sort referred to is described very generally and the clutches with the cooling oil supply arrangement therefor are disclosed fully in the co-pending application of Peterson and Schnepel, Serial No. 174,052, filed July 15, 1950. The present invention is concerned with a novel and highly advantageous system for supplying a lubricating and cooling fluid, which will be referred to hereafter as oil, to lubricate the reduction gear in such an installation and to cool the clutches during engagement thereof.

In brief outline, the system of this invention comprises two constantly driven pumps, one of which supplies the normal lubrication requirements and may supply a part of the cooling oil requirements. The other pump is normally bypassed by a valve which forms a part of the system. When cooling oil is required, this valve closes the bypass and directs the full flow of oil from both pumps into the fluid system to meet the increased demand. The nature of the system will be more fully apparent from the succeeding detailed description.

The principal objects of the invention are to improve power transmission mechanism such as reduction gears and clutches; to provide a hydraulic fluid system which is adapted to deliver either large or small quantities of oil efficiently and without significant bypassing of oil through a relief valve; and to provide a valve of simple and reliable nature particularly adapted to satisfy the requirements of a system of this type.

The manner in which these objects are realized, and other objects and advantages of the invention, will be apparent to those skilled in the art from the succeeding detailed description of the preferred embodiment of the invention.

Figure 1:
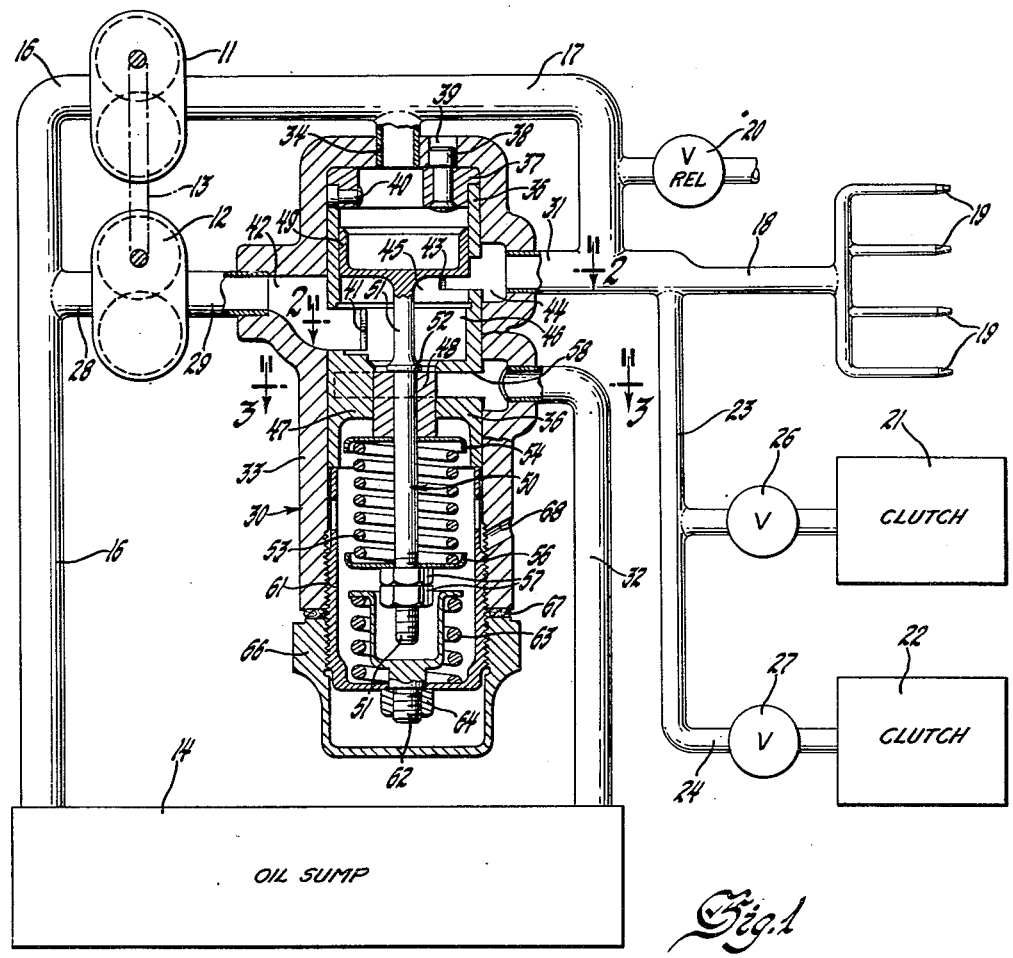
Figure 2:
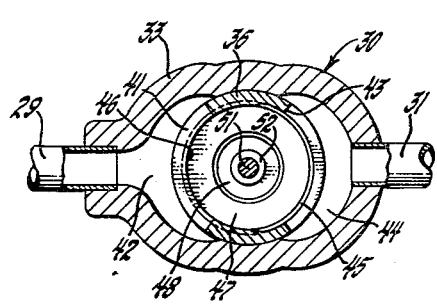
Figure 3:
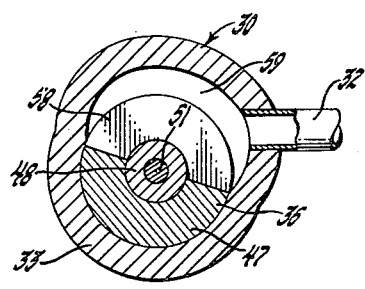

Referring to the drawings: Figure 1 is a schematic diagram of a fluid system according to the invention with the valve shown in section; and Figures 2 and 3 are transverse sectional views of the valve taken on the planes indicated in Figure 1.

The system includes a main pump 11 and a secondary pump 12 which are constantly operated by a shaft 13 driven in any suitable manner, preferably from the gearing which is to be lubricated. Pump 11 draws oil from a reservoir or sump 14 through a conduit 16 and discharges it under pressure through a conduit 17 and a lubricating oil line 18 to jets or other lubricating oil arrangements 19. The nature of the lubricating system is immaterial to the invention. It will be understood that, as is usual with lubricating systems, the flow from the oil lines 19 is restricted so that a substantial pressure drop occurs at the point of discharge of the oil. Thus, for example, in normal operation, the pressure in the lubrication lines 17 and 18 may be 180 pounds per square inch. The quantity of oil flowing is limited by the discharge restrictions or other arrangements which imposes a back pressure against the discharge of lubricating oil. A conventional relief valve 20 may limit the pressure in the line 17 in the usual manner to, say, 250 pounds per square inch. The relief valve is normally closed, but may open when the oil is cold.

Oil also is supplied for cooling to clutches 21 and 22 through lines 23 and 24 branching from the line 18. The cooling oil is required only when the clutches are being engaged; the supply of oil to the clutches is controlled by valves 26 and 27. The valves and clutches may be of the type disclosed in the aforementioned Peterson et al. application. The flow of cooling oil is considerably greater than the requirement for lubrication even though only one of the valves 26, 27 is open at one time. Therefore, if the pump 11 were of sufficient capacity to satisfy the cooling oil requirements in addition to the lubrication requirements, a very large pump would be required, and most of the flow from this pump would be bypassed through a relief valve during normal operation of the system in order to maintain the required pressure for lubrication. Such an arrangement would be wasteful of power and would heat the lubricating oil unnecessarily.

In the system of this invention, the secondary pump 12 is brought into operation when the cooling oil requirement arises to supply the additional capacity required, thus permitting the pump 11 to be of a size commensurate with constant lubrication requirements. Pump 12 is unloaded or bypassed except when cooling oil is required.

The pump 12 draws oil from the sump 14 through the conduit 16 and a branch conduit 28, and delivers through a conduit 29 to a valve 30. The discharge from the auxiliary pump 12 may flow from the valve through a conduit 31 into the lines 17 and thus to the lines 23 and 24. When the excess capacity is not required, the oil from the pump 12 is discharged from the valve 30 through a line 32 into the sump. It will be understood that the oil supplied to the lubricating system and clutches is returned to the reservoir or sump, which may in practice be the lower part of the housing in which the reduction gear and clutches are installed.

The valve 30 comprises a body 33 into which the conduits 29, 31 and 32 are introduced in any suitable manner. It will be understood that these conduits are shown schematically in Figure 1 and may, at least in part, be incorporated in the valve body or in the reduction gear casing in which the body is disposed. The upper end of the valve body 33 is closed by an integral head into which is directed a pressure connection 34 from the main pump discharge line 17. A sleeve 36 is fitted within the cylindrical internal bore of the body. This sleeve is maintained in correct angular relation to the inlet and outlet lines by a disk 37 from which a pin or rivet 38 projects into a bore 39 in the head of the valve body. A second pin or rivet 40, extending radially from the disk 37, is received in a slot or notch in the upper end of the sleeve 36. The sleeve 36 is cut through to define an oil inlet port 41 extending preferably through about one-third of the circumference of the sleeve. The inlet port 41 communicates with the chamber 42 in the valve body into which oil is supplied by the secondary pump line 29. The sleeve 36 is also cut away to provide a discharge port 43 extending preferably around about ninety degrees of the circumference through which oil is discharged into the chamber 44 of the body communicating with the outlet line 31. The port 43 enters a cylindrical interior chamber 45 in the sleeve 36 and the port 41 enters an extension 46 of the chamber 45 which is of slightly smaller diameter than the chamber 45 and is located below the chamber 45.

The sleeve 36 is partially closed by a web 47 below the chamber 46. An annular plug 48 is reciprocable in a cylindrical hole in the web 47.

A valve piston 49 is freely reciprocable in the bore 45 of the valve body, its downward movement being limited by engagement with the shoulder between the bores 45 and 46. This piston may move to open or close the port 43. A stem 51 integral with the valve piston 49 fits in and extends through the plug 48. A flange 52 on the stem 51 normally remains in engagement with the upper surface of the plug 48, thus determining the spacing between the piston 49 and plug 48. The plug 48 is maintained in engagement with the flange 52 by a compression spring 53 retained between a cup 54 bearing against the lower surface of the plug 48 and a cup 56 located on the valve stem by two nuts 57 received on the threaded lower end of the valve stem. The double nuts serve as jam nuts. The valve piston 49, stem 51, plug 48, and spring 53 constitute a reciprocable valve member 50.

The web portion 47 of the sleeve is slotted out to its diameter (Fig. 3) to form a discharge port 58 normally closed by the plug 48 and communicating with the chamber 59 in the valve body 33 which discharges into the return line 32.

The sleeve 36 is retained by a cup 61 threaded into the lower end of the valve body 33. The cup 61 and web 47 define a chamber within which the lower end of the valve stem 51 reciprocates. Toward its lower limit of travel the end of the valve stem engages a plunger 62 which is slidable in a hole in the head of the cup 61. The plunger 62 is urged upwardly by a compression spring 63 which normally holds a nut 64 run up against a shoulder on the plunger 62 in engagement with the cup 61. After engagement with the plunger 62 the valve stem 51 may move downward to a limited extent by compressing the spring 63.

The lower end of the valve body is closed by a cap 66 threaded onto the sleeve 61 which compresses a gasket 67 against the lower face of the valve body 33. Fluid leaking into the chamber in the lower part of the valve may escape through a bleed opening 68 in the valve body from which it returns to the sump.

The sliding valve member 50 may move either upwardly or downwardly from the position of Figure 1. In this position, the outlet to the return conduit 32 is closed and it will remain closed if the valve moves upwardly. If it moves downwardly, the bypass 58 will open. Also, in the position shown, the outlet 43 from the auxiliary pump to the line 31 is throttled. If the valve assembly moves upward, the effective area of the port 43 will be increased and, if it moves downwardly, the effective area will be decreased.

The pressure from the main pump 11 is exerted on the upward face of the piston 49 through the connection 34 at all times. The discharge pressure of the secondary pump 12 is exerted on the lower face of the piston 49 and the upper face of the plug 48. The effective area exposed to the discharge pressure from the secondary pump is thus less than that exposed from the pressure of the main pump. In the illustrated embodiment, the effective area exposed to secondary pump pressure is three-fourths of that exposed to main pump pressure.

Assuming that the system is in normal operation with the valves 26 and 27 closed, the valve member 50 will descend from its position shown in Figure 1 so that the piston 49 closes the port 43 and the plug 48 opens the bypass port 58. All of the discharge from the pump 11 is thus directed to the lubricating jets 19 and all of the discharge from the pump 12 flows into the valve 30 through the port 41 and out through the port 58. The pump 12 is thus unloaded, pumping only against the relatively small pressure drop due to flow through the valve 30. The piston 49 will be seated against the shoulder at the bottom of the chamber 44 and the spring 63 will be compressed by the full pressure acting on the upper surface of the piston 49. No significant pressure will be exerted against the lower face of the piston or the upper face of the plug 48, which will be seated against the shoulder 52.

Now, if either clutch 21 or 22 is engaged, the corresponding valve 26 or 27 is opened, providing a low resistance path for flow of oil from the line 18. The immediate effect of this is to lower greatly the pressure in the line 17 and thereby the pressure on the upper face of the piston 49. The pressure may be reduced to some twenty pounds per square inch. The force due to this reduced pressure is insufficient to compress the spring 63 so this spring, acting through the plunger 62, moves the valve member 50 upwardly. The upward movement of the plug 48 partially closes the bypass port 58. The valve is so proportioned that the pressure in the chamber below the piston 49, with the outlet 58 so throttled, is greater than four-thirds times the pressure above the piston with valve 26 or 27 open. Thus the resultant force on the plunger assembly is upward and the valve continues to move upward, further throttling and finally closing the bypass outlet and opening the discharge port 43 through which fluid flows from the secondary pump into the discharge line 31. The discharge from the secondary pump is thus added to that of the main pump.

The system will arrive at an equilibrium with a pressure below the piston four-thirds times that above the piston. This difference in pressure is maintained by throttling of the flow from the secondary pump 12 through the discharge port 43 by the piston 49. Ordinarily, the pressure with the valve 26, for example, open will be lower than that with the valve closed, even with both pumps in action. However, the pressure will be maintained high enough to provide adequate lubrication and cooling during the period of clutch engagement. If, for example, the pressure in the lines 17, 18, and 23 is 80 pounds per square inch, the pressure below the piston 49 will be 107 pounds per square inch.

This condition continues until the valve 26 closes, whereupon the pressure in the line 17 increases. In order to balance the pressure on both sides of the piston, the pressure drop across the port 43 must increase to a value equal to one-third of the new line pressure. Therefore, the piston 49 must move downward to a considerable extent to establish the required pressure drop at the port 43. Before the piston reaches this point, the plug 48 will have moved with the piston to a point at which the bypass port 58 begins to open. This further reduces the pressure below the piston and the piston moves down until it again engages the shoulder at the bottom of the bore 44. In this position the bypass outlet 58 is fully open and the spring 63 is compressed to some extent. The full cycle of operation of the valve has now been described.

It has been stated that the plug 48 normally remains seated against the shoulder 52. The movement of this plug against the resistance of the spring 53 occurs only if the pressure above the plug reaches an abnormally high value. The plug 48 and spring 53 thus constitute a safety or relief valve. If the pressure becomes abnormal, the spring 53 will be compressed to discharge some part of the output of the pump 12 into the bypass line 32 regardless of the position of the piston 49. Depending upon the constants of the sytem, this relief valve may open when the valve 26 closes and bypass some oil until the piston 49 descends to open the bypass independently of spring 53.

It will be understood that a relief valve such as valve 20 may be provided to discharge fluid from the line 17 if the pressure in this line becomes excessive, as is comtion in pressure fluid system, including lubrication systems. Such a valve may provide a limit such as 250 pounds per square inch to the pressure that may exist in the line 17. However, preferably, the capacity of the pump 11 is so proportioned to the requirements of the lubrication system that such a relief valve would normally remain closed when the oil is at normal operating temperature, the pressure in the line 17 being determined by the delivery of the pump and the resistance to flow of the lubrication system.

It will be seen from the foregoing that the invention provides a very simple, reliable, and effective arrangement for supplying either small or large quantities of fluid without objectionable bypassing of large quantities of fluid through a relief valve. It is thus capable of maintaining the normal pressure in the system under small load conditions and capable of maintaining a satisfactory pressure level under emergency demand conditions.

As an example of the operating results of the system, it may be assumed that the pumps 11 and 12 are of the same capacity and that with the valve 26 open the flow for clutch cooling is twice the flow to the lubrication system, and further assumed that the pressure in the line 17, with the valve 26 closed, is 180 pounds per square inch resulting from the pressure drop in the jets 19. With these assumptions, we obtain the following results. When valve 26 is opened, the flow of oil remains substantially constant since pump 11 is a positive displacement pump. Thus the flow through the line 18 drops to one-third of its former rate and the pressure drops to 20 pounds per square inch, one-ninth of the former value. When the valve 30 adds the discharge from the pump 12, the total flow is doubled. The lubrication system now receives two-thirds of the normal quantity of oil, which is sufficient, and the pressure in the lines 18 and 23 will rise to 80 pounds per square inch. The pump 12 is thus operating against a pressure of 107 pounds per square inch with a 27 pound drop across the port 43. The quantity of oil supplied to the clutch for cooling is four-thirds times the total flow of pump 11.

When the clutch is fully engaged, the cooling oil valve 26 or 27 is closed. Although the system would work with a valve which closes substantially instantaneously, preferably the actuation of the valve 26 to its closed position takes from about one-half second to four or five seconds. As the valve 26 closes, the pressure in the line 17 increases. If the valve closed completely, the doubled flow through the lubrication system would raise the pressure to about 720 pounds per square inch. Actually, this pressure is limited by the relief valve 20 to 250 pounds, but with 250 pound pressure above the piston 49, pressure below the piston will be 333 pounds and the drop through the port 43 must be 83 pounds per square inch. Since this is about three times the drop existing with the valve 26 open, the piston will move down to restrict the port 43 to about one-third of its former area. During this movement the bypass valve port 58 opens and the pressure is released below the piston so that the port 43 closes completely. The increase in delivery line pressure may actually take place gradually, but the nature of the operation will be apparent from the above.

Obviously, the system can be designed for various conditions by suitable apportioning of the capacities of the pumps and the relation between the areas of the ports 43 and 58 for various positions of the plunger assembly 50. Also, the characteristics of the valve may be modified by varying the relative areas of the piston 49 and plug 48.

An advantage of the system of the invention is that it is substantially unaffected by variations in the viscosity of the oil. Such changes will affect the values of the pressures in the system but since the valve responds to pressure ratios, the action is not disturbed by such changes.

The detailed description of the preferred embodiment of the invention is not to be construed as restricting the invention, since many modifications may be made by the exercise of skill in the art within the principles of the invention.

I claim:

1. A hydraulic fluid system comprising, in combination, first and second constantly operating pumps, a delivery conduit connected to the first pump, first and second discharge conduits supplied by the delivery conduit, a stop valve in the second discharge conduit, and a control valve responsive to pressure in the delivery conduit adapted to direct the flow from the second pump alternatively to the delivery conduit and to a bypass conduit, the control valve comprising a body with coaxial bores of different area, a reciprocable valve member including two parts slidable in the said bores and of corresponding areas, a pressure passage connecting the delivery conduit to the end of the larger bore remote from the smaller bore so that pressure in the delivery conduit acting against the part of larger area biases the valve member in one direction, a passage feeding the second pump discharge into the body between the parts of the valve member so that the second pump discharge pressure acting upon the differential area of the two parts biases the member in the other direction, a discharge port in the valve body connected to the delivery line and throttled progressively by movement of the valve member in the said one direction, a bypass port in the valve body progressively opened by movement of the valve member in the said one direction, a bypass conduit connected to the bypass port, and resilient biasing means coupling the two parts of the valve member adapted to yield to pressure on the smaller valve part to provide for movement thereof independently of the larger valve part in the direction to open the bypass port.

2. A hydraulic fluid system comprising, in combination, first and second constantly operating pumps, a delivery conduit connected to the first pump, first and second discharge conduits supplied by the delivery conduit, a stop valve in the second discharge conduit, and a control valve responsive to pressure in the delivery conduit adapted to direct the flow from the second pump alternatively to the delivery conduit and to a bypass conduit, the control valve comprising a body with coaxial bores of different area, a reciprocable valve member including two parts slidable in the said bores and of corresponding areas, a pressure passage connecting the delivery conduit to the end of the larger bore remote from the smaller bore so that pressure in the delivery conduit acting against the part of larger area biases the valve member in one direction, a passage feeding the second pump discharge into the body between the parts of the valve member so that the second pump discharge pressure acting upon the differential area of the two parts biases the member in the other direction, a discharge port in the valve body connected to the delivery line and throttled progressively by movement of the valve member in the said one direction, a bypass port in the valve body progressively opened by movement of the valve member in the said one direction, a bypass conduit connected to the bypass port, resilient biasing means coupling the two parts of the valve member adapted to yield to pressure on the smaller valve part to provide for movement thereof independently of the larger valve part in the direction to open the bypass port, and second resilient biasing means urging the valve member away from the position in which the discharge port is closed and the bypass port is open toward a position in which both ports are partly open.

3. A hydraulic fluid system comprising, in combination, first and second constantly operating pumps, a delivery conduit connected to the first pump, first and second discharge conduits supplied by the delivery conduit, a stop valve in the second discharge conduit, and a control valve responsive to pressure in the delivery conduit adapted to direct the flow from the second pump alternatively to the delivery conduit and to a bypass conduit, the control valve comprising a body with coaxial bores of different area, a reciprocable valve member including two parts slidable in the said bores and of corresponding areas, a pressure passage connecting the delivery conduit to the end of the larger bore remote from the smaller bore so that pressure in the delivery conduit acting against the part of larger area biases the valve member in one direction, a passage feeding the second pump discharge into the body between the parts of the valve member so that the second pump discharge pressure acting upon the differential area of the two parts biases the member in the other direction, a discharge port in the valve body connected to the delivery line and throttled progressively by movement of the valve member in the said one direction, and a bypass port in the valve body progressively opened by movement of the valve member in the said one direction.

4. A hydraulic fluid system comprising, in combination, first and second constantly operating pumps, a delivery conduit connected to the first pump, first and second discharge conduits supplied by the delivery conduit, a stop valve in the second discharge conduit, and a control valve responsive to pressure in the delivery conduit adapted to direct the flow from the second pump alternatively to the delivery conduit and to a bypass conduit, the control valve comprising a body with coaxial bores of different area, a reciprocable valve member including two parts slidable in the said bores and of corresponding areas, a pressure passage connecting the delivery conduit to the end of the larger bore remote from the smaller bore so that pressure in the delivery conduit acting against the part of larger areas biases the valve member in one direction, a passage feeding the second pump discharge into the body between the parts of the valve member so that the second pump discharge pressure acting upon the differential area of the two parts biases the member in the other direction, a discharge port in the valve body connected to the delivery line and throttled progressively by movement of the valve member in the said one direction, a bypass port in the valve body progressively opened by movement of the valve member in the said one direction, a bypass conduit connected to the bypass port, and resilient biasing means urging the valve member away from the position in which the discharge port is closed and the bypass port is open toward a position in which both ports are partly open.

5. A hydraulic fluid system comprising, in combination, first and second constantly operating pumps, a delivery conduit connected to the first pump, a first discharge conduit of relatively small capacity and a second discharge conduit of relatively large capacity supplied by the delivery conduit, a normally closed valve in the second discharge conduit, and a control valve responsive to pressure in the delivery conduit adapted to direct the flow from the second pump alternatively to the delivery conduit and to a bypass conduit, the control valve comprising a body with coaxial bores of different area, a reciprocable valve member including two parts slidable in the said bores and of corresponding areas, a pressure passage connecting the delivery conduit to the end of the larger bore remote from the smaller bore so that pressure in the delivery conduit acting against the part of larger area biases the valve member in one direction, a passage feeding the second pump discharge into the body between the parts of the valve member so that the second pump discharge pressure acting upon the differential area of the two parts biases the member in the other direction, a discharge port in the valve body connected to the delivery line and throttled progressively by movement of the valve member in the said one direction, and a bypass port in the valve body progressively opened by movement of the valve member in the said one direction.

6. A hydraulic fluid system comprising, in combination, first and second constantly operating pumps, a delivery conduit connected to the first pump, a first discharge conduit of relatively small capacity and a second discharge conduit of relatively large capacity supplied by the delivery conduit, a normally closed valve in the second discharge conduit, and a control valve responsive to pressure in the delivery conduit adapted to direct the flow from the second pump alternatively to the delivery conduit and to a bypass conduit, the control valve comprising a body with coaxial bores of different area, a reciprocable valve member including two parts slidable in the said bores and of corresponding areas, a pressure passage connecting the delivery conduit to the end of the larger bore remote from the smaller bore so that pressure in the delivery conduit acting against the part of larger area biases the valve member in one direction, a passage feeding the second pump discharge into the body between the parts of the valve member so that the second pump discharge pressure acting upon the differential area of the two parts biases the member in the other direction, a discharge port in the valve body connected to the delivery line and throttled progressively by movement of the valve member in the said one direction, a bypass port in the valve body progressively opened by movement of the valve member in the said one direction, a bypass conduit connected to the bypass port, and resilient biasing means urging the valve member away from the position in which the discharge port is closed and the bypass port is open toward a position in which both ports are partly open.

7. A hydraulic fluid system comprising, in combination, first and second constantly operating pumps, a delivery conduit connected to the first pump, a first discharge conduit of relatively small capacity and a second discharge conduit of relatively large capacity supplied by the delivery conduit, a normally closed valve in the second discharge conduit, and a control valve responsive to pressure in the delivery conduit adapted to direct the flow from the second pump alternatively to the delivery conduit and to a bypass conduit, the control valve comprising a body with coaxial bores of different area, a reciprocable valve member including two parts slidable in the said bores and of corresponding areas, a pressure passage connecting the delivery conduit to the end of the larger bore remote from the smaller bore so that pressure in the delivery conduit acting against the part of larger area biases the valve member in one direction, a passage feeding the second pump discharge into the body between the parts of the valve member so that the second pump discharge pressure acting upon the differential area of the two parts biases the member in the other direction, a discharge port in the valve body connected to the delivery line and throttled progressively by movement of the valve member in the said one direction, a bypass port in the valve body progressively opened by movement of the valve member in the said one direction, a bypass conduit connected to the bypass port, and resilient biasing means coupling the two parts of the valve member adapted to yield to pressure on the smaller valve part to provide for movement thereof independently of the larger valve part in the direction to open the bypass port.

8. A hydraulic fluid system comprising, in combination, first and second constantly operating pumps, a delivery conduit connected to the first pump, a first discharge conduit of relatively small capacity and a second discharge conduit of relatively large capacity supplied by the delivery conduit, a normally closed valve in the second discharge conduit, and a control valve responsive to pressure in the delivery conduit adapted to direct the flow from the second pump alternatively to the delivery conduit and to a bypass conduit, the control valve comprising a body with coaxial bores of different area, a reciprocable valve member including two parts slidable in the said bores and of corresponding areas, a pressure passage connecting the delivery conduit to the end of the larger bore remote from the smaller bore so that pressure in the delivery conduit acting against the part of larger area biases the valve member in one direction, a passage feeding the second pump discharge into the body between the parts of the valve member so that the second pump discharge pressure acting upon the differential area of the two parts biases the member in the other direction, a discharge port in the valve body connected to the delivery line and throttled progressively by movement of the valve member in the said one direction, a bypass port in the valve body progressively opened by movement of the valve member in the said one direction, a bypass conduit connected to the bypass port, resilient biasing means coupling the two parts of the valve member adapted to yield to pressure on the smaller valve part to provide for movement thereof independently of the larger valve part in the direction to open the bypass port, and second resilient biasing means urging the valve member away from the position in which the discharge port is closed and the bypass port is open toward a position in which both ports are partly open.

9. A hydraulic fluid system comprising, in combination, first and second constantly operating positive-displacement pumps, a delivery conduit constantly connected to the first pump, means for altering the resistance to discharge of fluid from the delivery conduit, throttling valve means connecting the delivery from the second pump to the delivery conduit, means responsive to pressure in the delivery conduit operative to close the throttling valve, means responsive to discharge pressure of the second pump opposing the first responsive means, the said responsive means being so constructed and arranged that the throttling valve is balanced when the ratio of the second pump discharge pressure to the delivery conduit pressure is a predetermined value greater than unity, and an unloading valve for the second pump opened by closing movement of the throttling valve beyond a predetermined position.

10. A hydraulic fluid system comprising, in combination, first and second constantly operating pumps characterized by increasing delivery pressure with decrease in flow, a delivery conduit constantly connected to the first pump, means for altering the resistance to discharge of fluid from the delivery conduit, throttling valve means connecting the delivery from the second pump to the delivery conduit, means responsive to pressure in the delivery conduit operative to close the throttling valve, means responsive to discharge pressure of the second pump opposing the first responsive means, the said responsive means being so constructed and arranged that the throttling valve is balanced when the ratio of the second pump discharge pressure to the delivery conduit pressure is a predetermined value greater than unity, an unloading valve for the second pump opened by closing movement of the throttling valve beyond a predetermined position, and a bypass conduit for the second pump connected to the unloading valve, the resistance to flow of the unloading valve and bypass conduit being sufficient that the said ratio exceeds the said predetermined value when the resistance of the delivery conduit becomes less than a certain value.

11. A hydraulic fluid system comprising, in combination, first and second constantly operating pumps characterized by increasing delivery pressure with decrease in flow, a delivery conduit constantly connected to the first pump, means for altering the resistance to discharge of fluid from the delivery conduit, throttling valve means connecting the delivery from the second pump to the delivery conduit, a first piston responsive to pressure in the delivery conduit operative to close the throttling valve, a second piston of less effective area than the first piston responsive to discharge pressure of the second pump opposing the first piston, and a a bypass conduit for the second pump including a valve opened by closing movement of the throttling valve beyond a predetermined position, the bypass conduit being constructed to develop sufficient back pressure when the second pump discharges therethrough that the force exerted on the second piston exceeds the force exerted on the first piston when the resistance to discharge of fluid from the delivery conduit becomes less than a predetermined value.

12. A hydraulic fluid system comprising, in combination, first and second constantly operating pumps characterized by increasing delivery pressure with decrease in flow, a delivery conduit constantly connected to the first pump, means for altering the resistance to discharge of fluid from the delivery conduit, throttling valve means connecting the delivery from the second pump to the delivery conduit, means responsive to pressure in the delivery conduit operative to close the throttling valve, means responsive to discharge pressure of the second pump opposing the first responsive means, the said responsive means being so constructed and arranged that the throttling valve is balanced when the second pump discharge pressure exceeds the delivery conduit pressure, an unloading valve for the second pump movable with the throttling valve and opened by closing movement of the throttling valve beyond a predetermined position, and resilient means adapted to permit opening movement of the unloading valve in excess of the movement of the throttling valve in response to excessive discharge pressure of the second pump.

13. A hydraulic fluid system comprising, in combination, a first fluid line, a stop valve therein, a second fluid line, a common supply conduit for the said lines, first and second constantly operating fluid supply pumps, means continuously connecting the discharge of the first pump to the supply conduit, and valve means responsive to the ratio of the pressure in the supply conduit to the discharge pressure of the second pump for connecting the discharge of the second pump alternatively to the supply conduit or to a by-pass, with the by-pass offering sufficient resistance to flow from the second pump to establish a pressure ratio sufficient to operate the valve to close the by-pass and connect the second pump to the supply conduit when the pressure in the supply conduit is reduced by opening the stop valve.

14. A hydraulic fluid system comprising, in combination, first and second constantly operating pumps of a type characterized by increasing delivery pressure with decrease in flow, a delivery conduit constantly connected to the first pump, means connected to the delivery conduit for altering the resistance to discharge of fluid from the delivery conduit, throttling valve means connecting the delivery from the second pump to the delivery conduit ahead of the said resistance-altering means, means responsive to pressure in the delivery conduit connected to the throttling valve means and operative to close the throttling valve means, means responsive to discharge pressure of the second pump connected in opposition to the first-named responsive means, the two said responsive means being so constructed and connected that the throttling valve is balanced when the second pump discharge pressure exceeds the delivery conduit pressure, and an unloading valve for the second pump connected to the second pump and coupled to the throttling valve opened by closing movement of the throttling valve beyond a predetermined position.

15. A hydraulic mechanism comprising, in combination, a first fluid-consuming device requiring fluid intermittently, means including a stop valve connected to the first device for supplying fluid to the first device, a second fluid-consuming device requiring fluid substantially continuously, a common supply conduit connected to the first device through the stop valve and connected to the second device, first and second constantly operating fluid supply pumps, a bypass outlet, means continuously connecting the discharge of the first pump to the supply conduit, and valve means including operating means connected to the supply conduit and to the second pump responsive to the ratio of the pressure in the supply conduit to the discharge pressure of the second pump, the valve means being connected to the second pump, the supply conduit, and the bypass outlet for connecting the discharge of the second pump alternatively to the supply conduit or to the bypass outlet, the bypass outlet being of such dimension relative to the capacity of the second pump and the characteristics of the operating means to offer sufficient resistance to flow from the second pump to establish a pressure ratio sufficient to actuate the responsive means to operate the valve means to close the bypass and connect the second pump to the supply conduit when the pressure in the supply conduit is reduced below a predetermined value by opening the stop valve.

References Cited in the file of this patent

UNITED STATES PATENTS

| | | |
|---|---|---|
| 1,477,850 | Pool | Dec. 18, 1923 |
| 1,760,070 | Kinsella | May 27, 1930 |
| 1,830,324 | La Mont | Nov. 3, 1931 |
| 1,877,091 | Vickers | Sept. 13, 1932 |
| 1,970,380 | Hosel | Aug. 14, 1934 |
| 2,218,565 | Vickers | Oct. 22, 1940 |
| 2,411,312 | Yonkers | Nov. 19, 1946 |
| 2,440,371 | Holley | Apr. 27, 1948 |
| 2,526,646 | Ericson | Oct. 24, 1950 |
| 2,617,361 | Neal | Nov. 11, 1952 |
| 2,649,906 | Neal et al. | Aug. 25, 1953 |